United States Patent
Miyazawa et al.

(10) Patent No.: US 6,872,120 B2
(45) Date of Patent: Mar. 29, 2005

(54) METHOD OF PRODUCING SPECTACLE LENS

(75) Inventors: Makoto Miyazawa, Nagano (JP); Yoshinori Tabata, Nagano (JP); Takahiro Uchidani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 09/958,568
(22) PCT Filed: Feb. 16, 2001
(86) PCT No.: PCT/JP01/01105
§ 371 (c)(1), (2), (4) Date: Oct. 11, 2001
(87) PCT Pub. No.: WO01/60553
PCT Pub. Date: Aug. 23, 2001

(65) Prior Publication Data
US 2002/0160690 A1 Oct. 31, 2002

(30) Foreign Application Priority Data
Feb. 16, 2000 (JP) .................................... P2000-037722

(51) Int. Cl.⁷ .......................... B24B 1/00; B24B 49/00; B24B 51/00
(52) U.S. Cl. ............... 451/5; 451/42; 451/43; 451/57; 451/58
(58) Field of Search ............... 451/5, 42, 43, 451/54, 57, 58

(56) References Cited

U.S. PATENT DOCUMENTS

| | | | |
|---|---|---|---|
| 5,140,782 A | * 8/1992 | Mecteau et al. | 451/42 |
| 5,158,422 A | * 10/1992 | Wagner | 409/84 |
| 5,341,604 A | * 8/1994 | Wood | 451/5 |
| 5,545,075 A | * 8/1996 | Gottschald | 451/42 |
| 6,011,630 A | * 1/2000 | Shanbaum et al. | 356/401 |
| 6,227,952 B1 | * 5/2001 | Diehl et al. | 451/140 |
| 2001/0003083 A1 | * 6/2001 | Roberts et al. | 451/5 |

FOREIGN PATENT DOCUMENTS

| EP | 0 281 754 A2 | 9/1988 |
|---|---|---|
| JP | 5-237702 | 9/1993 |
| JP | 10-175149 | 6/1998 |
| JP | 11-309602 | 11/1999 |
| JP | 11-309692 | 11/1999 |

* cited by examiner

Primary Examiner—Timothy V. Eley
(74) Attorney, Agent, or Firm—Sughrue Mion, PLLC

(57) ABSTRACT

A lens surface shape is created by a near-finish surface forming rough-cutting step of creating a near-finish surface shape analogous to a lens surface shape based on a prescription of a spectacle lens from a spectacle lens base material 11 by numerically controlled cutting, and a finish-cutting step of creating the lens surface shape based on the prescription of the spectacle lens from the near-finish surface shape by numerically controlled cutting. According to this method of producing a spectacle lens, all kinds of spectacle lenses including an inner surface progressive power lens can be produced with high productivity.

A complex curved surface can be mirror-polished by a polishing tool, which includes an elastic sheet 41 having a curved surface, wherein a workpiece is polished by applying a pressure to the inner surface side of the elastic sheet 41, to stretch the elastic sheet 41 and bring the outer surface side of the elastic sheet 41 into contact with the workpiece.

14 Claims, 8 Drawing Sheets

Fig. 5
(a)
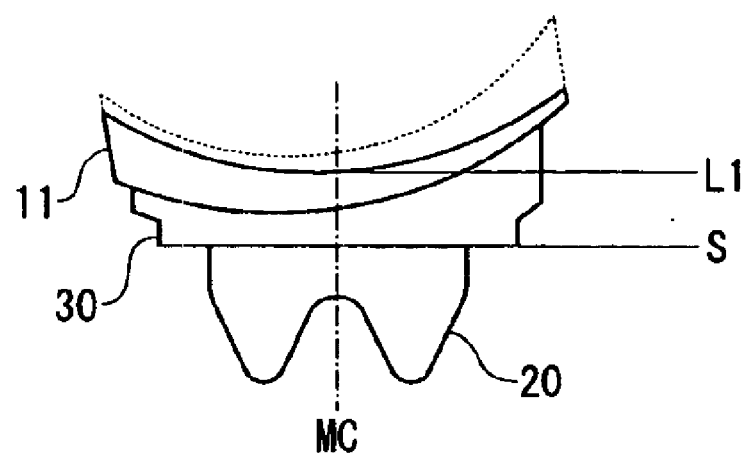
(b)
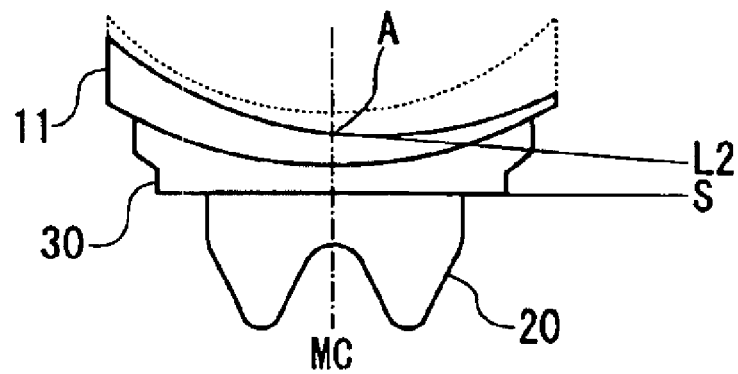

Fig. 8
(5)
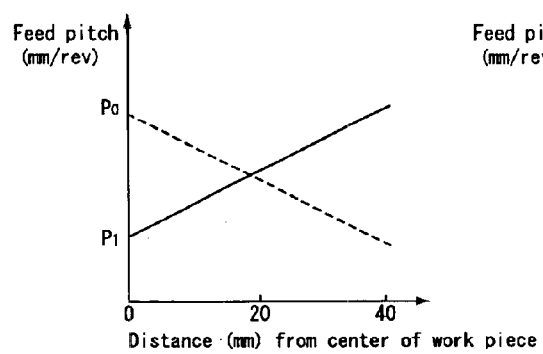
(6)
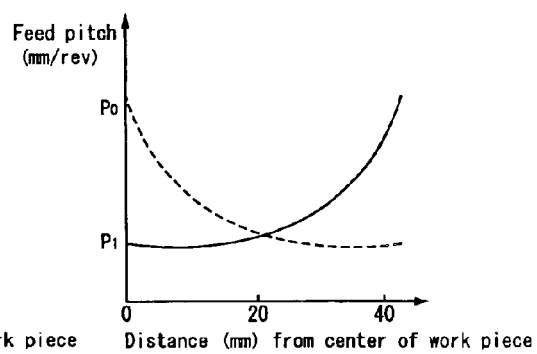
(7)
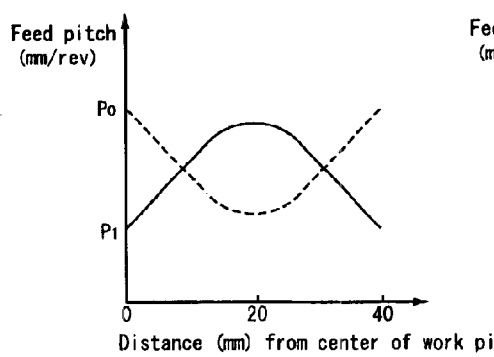
(8)
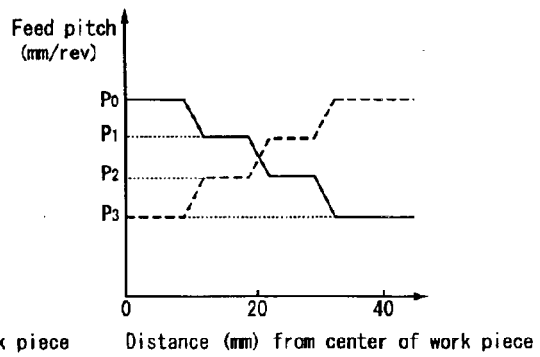

METHOD OF PRODUCING SPECTACLE LENS

TECHNICAL FIELD

The present invention relates to a method of producing a spectacle lens and a polishing tool, and particularly to a method of producing a spectacle lens, which is capable of creating surface shapes of all kinds of spectacle lenses by cutting, and a polishing tool suitable for mirror-polishing a curved surface.

BACKGROUND ART

Plastic spectacle lenses mainly used as spectacle lenses at present are produced by two methods. According to one method, a finished lens is directly formed by cast molding, wherein both surfaces of the lens are formed into final optical surfaces of a spectacle lens by transferring surface shapes of molds thereto. According to the other method, a thick semi-finished lens is previously formed by cast molding, wherein one surface of the lens is finished into a final optical surface by transferring a surface shape of one of molds thereto, and then the other surface of the lens is formed into a specific lens surface shape by cutting and polishing.

Spectacle lenses are classified into two major types: single-focal lenses and multi-focal lenses. The most popular kind of multi-focal lenses is a progressive power lens having a progressive surface composed of a distance portion, a near portion, and a progressive portion in which a focal length is continuously changed between the distance portion and the near portion. A single-focal lens basically has factors of a spherical power, an astigmatic (cylindrical) power, and a lens thickness, and a multi-focal lens basically has factors of a spherical power, an astigmatic (cylindrical) power, an astigmatic axis, an addition (ADD) power, and a lens thickness. The number of combinations of these factors becomes very large, particularly, significantly large for multi-focal lenses. Accordingly, the method of directly forming a finished lens by cast molding has been limited to production of frequently ordered spectacle lenses having popular combinations of the above factors, and many plastic lenses have been produced by forming finished lenses from semi-finished lenses by cutting.

In the case of adopting the method of forming finished lenses from semi-finished lenses by cutting, it is required to previously prepare the semi-finished lenses by molding. A semi-finished lens is produced by cast molding using two molds. In the cast molding, the convex side of the lens is formed into a spherical surface (for a single-focal lens) or a progressive surface (for a progressive power lens) by transferring a shape of one of the two molds thereto, and the concave side of the lens is formed into a shape, which is thicker than a finish size so as to be cut into any of finish shapes requested by prescriptions in a certain range, by transferring a shape of the other mold thereto. The concave surface of the semi-finished lens is then formed into a shape, which is a spherical surface shape (for a spherical lens) or a desired toric surface shape (for an astigmatic lens) and which has a specific thickness, by rough-cutting using a so-called curve generator or a generator capable of forming a pseudo toric surface. The concave surface of the semi-finished lens, which has been subjected to rough-cutting, is subjected to a copy lapping work similar to a so-called lapping work, to be accurately finished. The copy lapping step involves mounting a lens held on a specialized jig onto a working dish made from aluminum or the like on which a polishing pad is previously stuck, strongly pressing the working dish to the lens while pouring a lapping solution to a surface of the lens, and lapping the working dish relative to the lens, thereby transferring the surface shape of the working dish to the lens surface. A final lens surface shape with less roughness is obtained in the copy lapping step. The roughness of the lens surface is then smoothened by using an apparatus similar to that used in the copy lapping step, to obtain a final optical surface of the lens.

In recent years, however, there has been proposed a so-called inner surface progressive power lens in which a progressive surface or a curved surface obtained by synthesizing a progressive surface with a toric surface is provided on a concave surface on the eyeball side. Such an inner surface progressive power lens is advantageous in reducing fluctuation and distortion as faults of a progressive power lens on which a progressive surface is formed on the outer surface side, thereby significantly improving optical performances of the lens.

However, the prior art curve generator, which has been used for creating a concave surface on the eyeball side, can create only either a spherical surface or a toric surface because of its machining structure, and cannot create a progressive surface or a complex curved surface obtained by synthesizing a progressive surface with a toric surface on the concave surface. Further, the copy lapping work, which has a principle of lapping a working dish with a lens surface to transfer the shape of the working dish on the lens surface, cannot create a complex curved surface such as a progressive surface.

Accordingly, it has been required to develop a new method of producing a spectacle lens, which is capable of producing lenses having complex curved surfaces, such as an inner surface progressive power lens, with high productivity.

It has been also required to develop a polishing tool capable of mirror-polishing a complex curved surface created by the above-described method of producing a spectacle lens.

In view of the foregoing, the present invention has been made, and an object of the present invention is to provide a method of producing a spectacle lens, which is capable of producing all kinds of spectacle lenses including an inner surface progressive power lenses with high productivity.

Another object of the present invention is to provide a polishing tool capable of mirror-polishing a complex curved surface.

DISCLOSURE OF INVENTION

To achieve the above object, the present invention provides a lens shape creating step performed by numerically controlled (NC) cutting. The shape creating step may include a near-finish surface forming rough-cutting step of speedily rough-cutting a spectacle lens base material into a surface shape analogous to a desired lens surface shape, and a finish-cutting step of accurately finish-cutting the resultant surface shape into the desired lens surface shape. With this configuration, all kinds of lens surface shapes in a wide range from a simple spherical surface to a complex free curved surface such as a progressive surface or a curved surface obtained by synthesizing a progressive surface with a toric surface can be produced with high productivity.

The numerically controlled cutting may be performed such that the spectacle lens base material is rotated on its rotational axis in a Y-direction and simultaneously a position of a cutting tool in each of the X-direction and Y-direction relative to a position of the spectacle lens base material is synchronized with rotation of the spectacle lens base material. With this configuration, it is possible to create all kinds of surface shapes.

The numerically controlled cutting may be performed by using a numerically controlled machine provided with a cutting tool for rough-cutting and a cutting tool for finish-cutting, which are changeable to each other. With this configuration, by using the cutting tool for rough-cutting in the near-finish surface forming rough-cutting step, and the cutting tool for finish-cutting in the finish-cutting step, it is possible to continuously carry out a series of the cutting steps in the shape creating step by using one numerically controlled machine.

In the work of cutting a lens base material, since the lens base material is a plastic, if machining conditions are not suitably selected depending on a final shape and a kind of the lens base material, chipping may occur. From this viewpoint, the machining conditions are preferably changed depending on a position of a cutting tool relative to the spectacle lens base material.

Of the machining conditions, a feed pitch is most important. To suppress occurrence of chipping, the feed pitch at the outer peripheral surface of the spectacle lens base material is preferably set to be smaller than the feed pitch at the inner peripheral surface of the spectacle lens base material.

The numerically controlled cutting work can keep up with addition of a prism and an off-center contained in a prescription of a spectacle lens without changing any jig holding the spectacle lens base material only by adding data of the prism and off-center to the machining data for numerical control.

The shape creating step may include an outer diameter cutting step of reducing an outer diameter of a lens into a specific outer diameter and a chamfering step.

In the shape creating step of the present invention, a lens surface shape based on a prescription of a spectacle lens can be obtained; however, a mirror-polishing step for finishing the lens surface into a final optical surface is preferably provided.

To mirror-polish a complex curved surface, it is preferred to use a polishing tool, which includes an elastic sheet having a curved surface, wherein a workpiece is polished by applying a pressure to the inner surface side of the elastic sheet, to stretch the elastic sheet and bring the outer surface side of the elastic sheet into contact with the workpiece. With this configuration, since the elastic sheet follows the shape of the curved surface of the workpiece, even a complex curved surface of the workpiece can be uniformly mirror-polished.

BRIEF DESCRIPTION OF DRAWINGS

FIGS. 5(*a*) and 5(*b*) are schematic side views showing an arrangement of a workpiece on a block jig in the case of adding a prism in shape creating steps, wherein FIG. 5(*a*) shows a prior art method, and FIG. 5(*b*) shows a method of the present invention;

FIGS. 8(5) to 8(8) are graphs showing patterns of feed pitches.

BEST MODE FOR CARRYING OUT THE INVENTION

Hereinafter, an embodiment of a method of producing a spectacle lens according to the present invention will be described with reference to the drawings.

The method of producing a spectacle lens according to the present invention is not limited to production of single-focal lenses or multi-focal lenses but is applicable to production of spectacle lenses having all kinds of desired lens surface shapes. Examples of the lens surface shapes may include a spherical surface, a rotation-symmetric aspherical surface, a toric surface, an aspherical astigmatic surface obtained by synthesizing a toric surface with an aspherical surface, a progressive surface, and a curved surface obtained by synthesizing a progressive surface with a toric surface. The present invention is of course applicable to other surface shapes, which will be developed in the future, than the above exemplified lens surface shapes. The method of producing a spectacle lens according to the present invention is particularly suitable for production of a so-called inner surface progressive power lens in which a progressive surface or a curved surface obtained by synthesizing a progressive surface with a toric surface is provided for a concave surface on the eyeball side. The description of the present invention will be mainly made by example of production of an inner surface progressive power lens.

The method of producing a spectacle lens according to the present invention has shape creating steps for creating a lens surface shape of one or both of the concave side (outer surface side) and convex side (inner surface side) of a spectacle lens base material by cutting. The cutting in each shape creating step is made by numerical control on the basis of machining data for numerical control.

Figure 1:
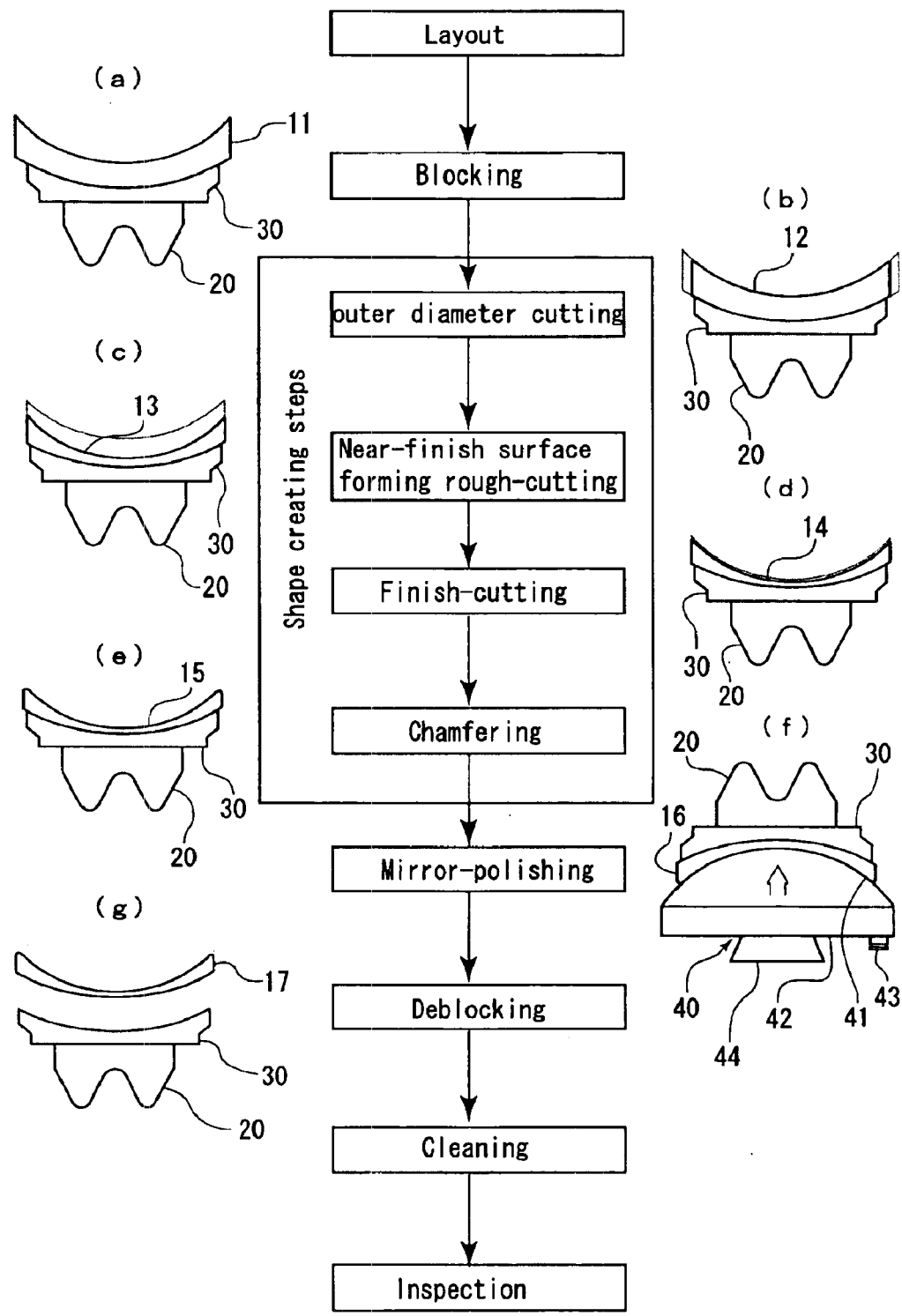
FIG. 1 is a flow chart showing steps of producing a spectacle lens according to the present invention, and FIGS. 1(*a*) to 1(*g*) are schematic views showing states machined in respective steps.

FIG. 1 is a flow chart showing one embodiment of a polishing process including a series of shape creating steps according to the method of producing a spectacle lens of the present invention. Each step is appended with a schematic view showing a state of a lens machined in the step. As shown in FIG. 1, the polishing process includes a layout step, a blocking step, the shape creating steps according to the present invention, a mirror polishing step, a deblocking step, a cleaning step, and an inspection step.

Prior to the polishing process, prescription data of a spectacle lens of a customer have been inputted in a host computer by transmitting the data from an online terminal thereto or directly inputting the data therein via an input means, and a lens shape has been designed on the basis of the prescription data by a calculating computer, to thus obtain machining data for numerical control. The machining data for numerical control include outer diameter cutting data, near-finish surface forming rough-cutting data, finish-cutting data, and chamfering data.

The outer diameter cutting data are used for cutting an unnecessary outer peripheral portion of a semi-finished lens so as to reduce the outer diameter to a specific outer diameter.

The near-finish surface forming rough-cutting data are used for cutting a surface on the concave side or convex side of the semi-finished lens to create a near-finish surface shape which is analogous to a desired lens surface shape and which is capable of reducing a cutting margin in the subsequent finish-cutting step, and for cutting the relatively thick semi-finished lens to a specific thickness.

As the near-finish surface shape, for example, there are calculated a free curved surface shape for rough-cutting, which is analogous to a finished lens surface shape based on the prescription data of the spectacle lens and which is slightly thicker than the finished lens surface shape; a lens surface shape which is identical to the finished lens surface shape; or a simple surface shape for rough-cutting, which has a slightly large cutting margin with respect to the finished lens surface shape but is capable of reducing a cutting margin in the subsequent finish-cutting step. Concretely, if the prescription data contain an astigmatism, as the near-finish surface shape, there is calculated a toric surface shape for rough-cutting, which has a minimum finish-cutting margin for each of three points: a coordinate of a lens center of the finished lens surface shape, a coordinate of an outer edge of the finished lens surface shape in an astigmatic axis direction of the finished lens surface shape, and a coordinate of an outer edge of the finished lens surface shape in the direction perpendicular to the astigmatic axis direction. On the other hand, if the prescription data do not contain any astigmatism, as the near-finish surface shape, there is calculated a spherical surface shape for rough-cutting, which has a minimum finish-cutting margin for each of three points: a coordinate of a lens center, a coordinate of the thinnest portion of the entire periphery of an outer edge, and a coordinate of the thickest portion of the entire periphery of the outer edge in the finished lens surface shape. As a result, although the cutting margin at lens portions are different from each other, the near-finish surface shape is thicker than the finished lens surface shape, for example, by a value ranging from 0.1 to 5.0 mm.

The finish-cutting data are used for cutting the above-described free curved surface shape for rough-cutting, or the toric or spherical near-finish surface shape for rough-cutting by a cutting margin ranging from 0.1 to 5.0 mm, to accurately create a lens surface shape based on the prescription data of the spectacle lens.

The chamfering data are used for chamfering an edge of the surface, which has been finished by finish-cutting, of the semi-finished lens.

The machining data for numerical control are transmitted from the calculating computer to the host computer and are loaded in the host computer. At the time of machining the semi-finished lens, the machining data for numerical control are transmitted from the host computer to a numerically controlled machine for polishing, and are stored in a memory built in the numerically controlled machine.

As a spectacle lens base material to be machined, a semi-finished lens is mainly used. If both surfaces of a spectacle lens base material are subjected to shape creation, the base material may have a simple cylindrical shape. A semi-finished lens is produced by preparing two glass molds opposed to each other with a specific gap put therebetween and sealing the gap with an adhesive tape or the like, injecting a monomor as a lens material in the gap (cavity), hardening the monomer, and releasing a molded product from the glass molds. For a single-focal lens or a usual multi-focal lens, a convex side of a semi-finished lens is formed by transferring a shape, equivalent to a final optical surface of the lens, of one glass mold thereto, and a concave side of the semi-finished lens is formed by transferring a shape, equivalent to a lens shape being large enough to be cut into any of finish shapes requested by prescriptions in a certain range, of the other glass mold thereto. The semi-finished lens, therefore, has a thickness relatively larger than a finish thickness. For an inner surface progressive power lens produced by cast molding, a convex side of a semi-finished lens is formed by transferring a shape, equivalent to a final spherical or aspherical optical surface shape, of one glass mold thereto, and a concave side of the semi-finished lens is formed by transferring a shape, equivalent to a lens shape being large enough to be cut into any of finish shapes requested by prescriptions in a certain range, of the other glass mold thereto. A large number of kinds of semi-finished lenses must be prepared in consideration of combinations of outer shapes, thickness, and the like.

Next, prior to the polishing process, an optimum semi-finished lens to be machined is selected from the stocked semi-finished lenses on the basis of a design of a lens shape by the calculating computer, and the selected semi-finished lens is informed to the host computer. The associated semi-finished lens is manually picked up or automatically picked up by using an automatic stockroom or the like.

In the polishing process shown in FIG. 1, in the layout step, a positioning mark for setting the selected semi-finished lens to a block jig is added to the selected semi-finished lens. The layout step is required for toric forming work or prism adding work of a multi-focal lens with its vertical direction uniquely determined, and can be omitted for a single-focal lens with no directivity.

In the blocking step, as shown in FIG. 1($a$), the convex or concave side of a semi-finished lens 11 is adhesively bonded, via a blocking cement 30 made from a low melting point metal alloy, to a block jig 20 to be mounted to the numerically controlled machine. At this time, the semi-finished lens 11 is arranged such that the positioning mark added to the semi-finished lens 11 is located to a specific position of the block jig 20.

The shape creating steps as the feature of the present invention are then performed. In the shape creating steps, one side of the semi-finished lens is cut to create a lens surface shape based on the prescription of the target spectacle lens. A final optical surface may be sometimes obtained by the shape creating steps; however, if the lens surface obtained in the shape creating steps has fine roughness, the mirror-polishing step for smoothening the roughness on the lens surface is followed by the shape creating steps.

The shape creating steps according to the present invention include an outer diameter cutting step, a near-finish surface forming rough-cutting step, a finish-cutting step, and a chamfering step. The outer diameter cutting step is provided to reduce the outer diameter to a specific value by removing a unnecessary outer peripheral portion of a semi-finished lens by cutting. This step is also required to shorten working times necessary for the subsequent rough-cutting and finish-cutting steps. The near-finish surface forming rough-cutting step is provided to speedily create a near-finish surface shape analogous to a desired lens surface shape, and to speedily cut the relatively thick semi-finished lens into a specific thickness. The finish-cutting step is provided to accurately create a desired lens surface shape from the near-finish surface shape by cutting. The chamfering step is provided to chamfer an edge of the lens having been finished in the finish-cutting step, which edge is too sharp to damage an operator and is liable to be chipped. The outer diameter cutting step is usually carried out before the near-finish surface forming rough-cutting step; however, the step may be carried out before or after the finish-cutting step. In addition, if the outer diameter of the semi-finished lens corresponds to that based on the prescription data, the outer diameter cutting step may be omitted. The chamfering step may be sometimes omitted. Further, if the shape of the semi-finished lens is significantly close to a lens surface shape based on the prescription data of the target spectacle lens, the lens surface shape based on the prescription data of the spectacle lens can be sometimes obtained only by directly finish-cutting the semi-finished lens while omitting the rough-cutting step.

To carry out the shape creating steps, there can be used cutting machines specialized for the outer diameter cutting step, the near-finish surface forming rough-cutting step, the finish-cutting step, and the chamfering step. Since the kinds and movements of cutting tools differ among the cutting steps, it is required to use the cutting machine specialized for each cutting step. This makes it possible to perform, in each cutting step, the cutting under the optimum cutting condition by using the optimum cutting tool, and hence to efficiently perform the cutting work at a high accuracy.

In the outer diameter cutting step, there can be used a specialized numerically controlled outer diameter cutting machine (not shown). The block jig 20 is set to a chuck of the cutting machine, and outer diameter cutting data are inputted in the cutting machine. Alternatively, the cutting machine may request the host computer for outer diameter cutting data via a communication line and store the data thus transmitted therefrom in a memory of the cutting machine. The numerically controlled outer diameter cutting machine rotates a workpiece in the Y-axis direction and simultaneously controls the position of a cutting tool in both the Y-axis direction and the radial direction (X-axis direction) of the workpiece on the basis of the outer diameter cutting data, to cut the outer diameter of the semi-finished lens 11 into a specific outer diameter by the cutting tool moved along a side surface of the semi-finished lens 11, thereby forming a semi-finished lens 12 as shown in FIG. 1(b).

Figure 2:
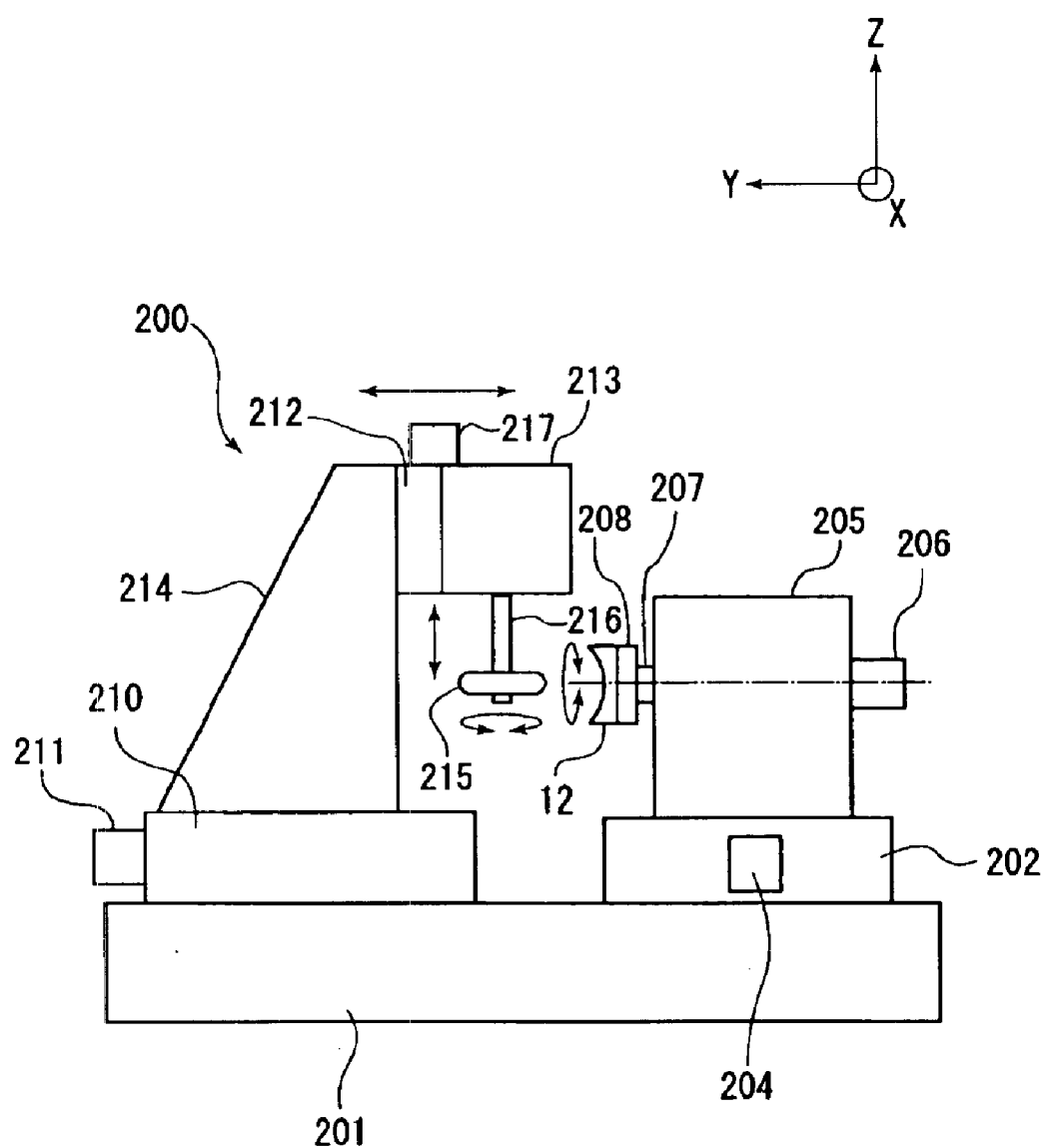
FIG. 2 is a side view showing a schematic configuration of a numerically controlled grinding machine used for the method of producing a spectacle lens according to the present invention.

In the near-finish surface forming rough-cutting step, a specialized numerically controlled machine can be used. FIG. 2 shows a schematic configuration of a numerically controlled cutting machine as one example of the numerically controlled machine used in the near-finish surface forming rough-cutting step. A numerically controlled cutting machine 200 includes an X-axis positioning means 202 and a Y-axis positioning means 210, which are mounted on a bed 201. The X-axis positioning means 202 is driven in an X-axis direction (perpendicular to the paper plane) by an X-axis drive motor and an encoder 204. A workpiece shaft rotating means 205 is mounted on the X-axis positioning means 202. A workpiece chuck 208, which is mounted on a workpiece rotating shaft 207, is rotatable by a workpiece rotating shaft drive motor and an encoder 206, and the rotational position of a workpiece is indexed. The Y-axis positioning means 210 is driven in a Y-axis direction, which is substantially the horizontal direction, by a Y-axis drive motor and an encoder 211. A Z-axis positioning means 212 and a cutting tool rotating means 213 are mounted on the Y-axis positioning means 210 via a Z-axis column 214. A grinding tool (circular cutter) 215 is rotated by the cutting tool rotating means 213 via a cutting tool rotating shaft 216. The grinding tool 215 and the cutting tool rotating means 213 are movable up or down in a Z-axis direction by a Z-axis drive motor of the Z-axis positioning means 212 and an encoder 217. The Z-axis positioning means 212 is provided mainly for aligning the axis of the workpiece with the axis of the circular cutter 215. The semi-finished lens (workpiece) 12 is held by the workpiece chuck 208 via a block jig (not shown).

According to the numerically controlled cutting machine 200, the X-axis positioning means 202 and the Y-axis positioning means 210 are controlled in synchronization with the rotational position of the workpiece 12, whereby the position of the workpiece 12 in each of the X-axis direction and Y-axis direction relative to the position of the grinding tool 215 is controlled.

Near-finish surface forming rough-cutting data are directly inputted in the numerically controlled cutting machine 200, or transmitted thereto via the host computer and stored therein. A center coordinate of the circular cutter 215 is positioned in the normal line direction erected from a point, to be machined, of the workpiece by using three axes of the X-axis positioning means 202, the Y-axis positioning means 210, and the workpiece rotating means 205. The positioning of the center coordinate of the circular cutter 215, which corresponds to the point, to be machined, of the workpiece 12, is continuously performed, whereby the lens surface of the workpiece 12 is formed, by rough-cutting, into a free curved surface shape or a spherical or toric surface shape on the basis of the near-finish surface forming rough-cutting data.

In the near-finish surface forming rough-cutting step, as shown in FIG. 1(c), a semi-finished lens 13 having a rough-cut surface with its surface roughness Rmax specified in a range of 100 $\mu$m or less can be obtained.

In the finish-cutting step, finish-cutting is performed under a finish-cutting condition by using a cutting machine, similar to the numerically controlled cutting machine 200, on which a finish-cutting tool is previously mounted. The rough-cut surface of the semi-finished lens 13 is thus accurately cut into a desired final lens surface shape on the basis of finish-cutting data.

In the finish-cutting step, as shown in FIG. 1(d), a semi-finished lens 14 having a surface roughness Rmax in a range of about 0.1 to 10 $\mu$m can be obtained.

In the chamfering step, a specialized numerically controlled chamfering machine (not shown) can be used. The block jig 20 is set to a chuck of the chamfering machine, and chamfering data are inputted in the chamfering machine. Alternatively, the chamfering machine may request the host computer for chamfering data via a communication line and store the data thus transmitted therefrom in a memory of the chamfering machine. The numerically controlled chamfering machine rotates the semi-finished lens 14 and simultaneously brings a cutting tool into contact with an edge of the finished surface of the semi-finished lens 14, to chamfer the edge of the finished surface of the semi-finished lens 14.

In the chamfering step, as shown in FIG. 1(e), a semi-finished lens 15, which has been subjected to chamfering, can be obtained.

The shape creating steps are followed by a mirror-polishing step for smoothening roughness on the lens surface, as needed. The lens surface can be finished, by finish-cutting, into a surface having a surface roughness Rmax in a range of about 0.1 to 10 μm in the finish-cutting step, and the lens surface thus finished by finish-cutting can be further finished into a final optical surface having a surface roughness Rmax of about several ten nm in the mirror-polishing step. In the mirror-polishing step, if the surface to be polished is a concave surface of a single-focal lens or a concave surface of a multi-focal lens having a progressive surface on the convex side, since the surface to be polished is a spherical or toric surface, it can be polished by the prior art polishing method using a working dish: however, if the surface to be polished is a complex curved surface such as an inner surface of an inner surface progressive power lens, it cannot be polished by the prior art polishing method using a working dish.

The polishing of a complex curved surface such as an inner surface of an inner surface progressive power lens is preferred to be made by using a copy polishing tool shown in FIG. 1(f). A copy polishing tool 40 has an curved elastic sheet 41. The mirror-polishing work using the copy tool 40 is performed by applying a pressure to the inner surface side of the elastic sheet 41, to stretch the elastic sheet 41 and simultaneously bring the outer surface side of the elastic sheet 41 into contact with a workpiece 16, and polishing the surface of the workpiece 16 into a mirror-like surface. To be more specific, the elastic sheet 41 is configured as a flexible rubber sheet formed into a semi-spherical shape, which sheet is mounted to a circular-dish shaped housing 42 with a sealed space put therebetween; and a pressure gas or fluid is supplied in the sealed space from an opening for gas or fluid 43, to thereby impart a specific pressure to the inner side of the rubber sheet 41 so that the rubber sheet 41 is kept in a semi-spherical state. The semi-spherical shape of the rubber sheet 41 can be changed depending the shape of the workpiece 16 by changing the pressure of the gas or fluid supplied in the sealed space. A chucking portion 44 provided on the back side of the housing 42 of the copy polishing tool 40 can be fixed to a swinging apparatus (not shown). A polishing cloth such as a nonwoven fabric is stuck on the surface of the rubber sheet 41. At the time of polishing, the rotating and swinging housing 42 is pressed to the workpiece 16 while a polishing solution is supplied between the rubber sheet 41 and the workpiece 16.

The copy polishing tool 40 is advantageous in that since the rubber sheet 41 is brought into contact with the surface of the workpiece 16 with an equal pressure applied thereto, even if the surface of the workpiece 16 is a complex curved surface, the rubber sheet 41 can follow the shape of the surface of the workpiece 16, with a result that the surface of the workpiece 16 can be uniformly polished. The polishing using the copy polishing tool 40 is particularly suitable for polishing a free curved surface such as an inner surface of an inner surface progressive power lens.

The polishing of a complex curved surface may be performed by using a numerically controlled polishing machine. For example, the polishing of a complex curved surface of a workpiece by using a numerically controlled polishing machine involves positioning a polishing tool head relative to the workpiece and setting an arbitrary point of the surface of the polishing tool head to the normal line direction erected from a point to be polished of the workpiece on the basis of NC polishing data previously calculated from the designed shape of a lens, and bringing the polishing tool head into press-contact with the workpiece in the normal line direction erected from the point to be polished of the workpiece. With this numerically controlled polishing process, the shape of a curved lens surface created in the shape creating steps can be polished into a final optical surface while keeping the curved lens shape.

Both the surfaces of the semi-finished lens, which have been subjected to finish-cutting, are thus formed into final optical surfaces in the mirror-polishing step, to obtain a finished lens 17. Thereafter, since the block jig 20 becomes unnecessary, as shown in FIG. 1(g), the deblocking step is performed, in which the finished lens 17 is removed from the block jig 20. The finished lens 17 is then subjected to the cleaning step in which contamination adhering on the finished lens 17 is cleaned, and is finally subjected to the inspection step. The polishing process is thus completed.

The finished lens 17 is then sequentially subjected to a dyeing step, a hard coat film forming step, an antireflection film forming step, and the like, to obtain a final lens.

The shape creating steps performed by cutting using such numerical control are effective to eliminate the prior art copy lapping work, and are allowed to create all kinds of curved surface shapes, and more specifically, make it possible to eliminate the need of provision of a large number of working dishes which have been required for each lens surface shape in the copy lapping work and also to eliminate the need of the use of indirect materials such as a polishing compound and a polishing pad, and hence to reduce the production cost.

In the above description, the specialized cutting machines are used in respective shape creating steps of the polishing process; however, in the shape creating steps according to the present invention, the outer diameter cutting work, the near-finish surface forming rough-cutting work, the finish-cutting work, and the chamfering work can be performed by using one numerically controlled machine.

Figure 3:
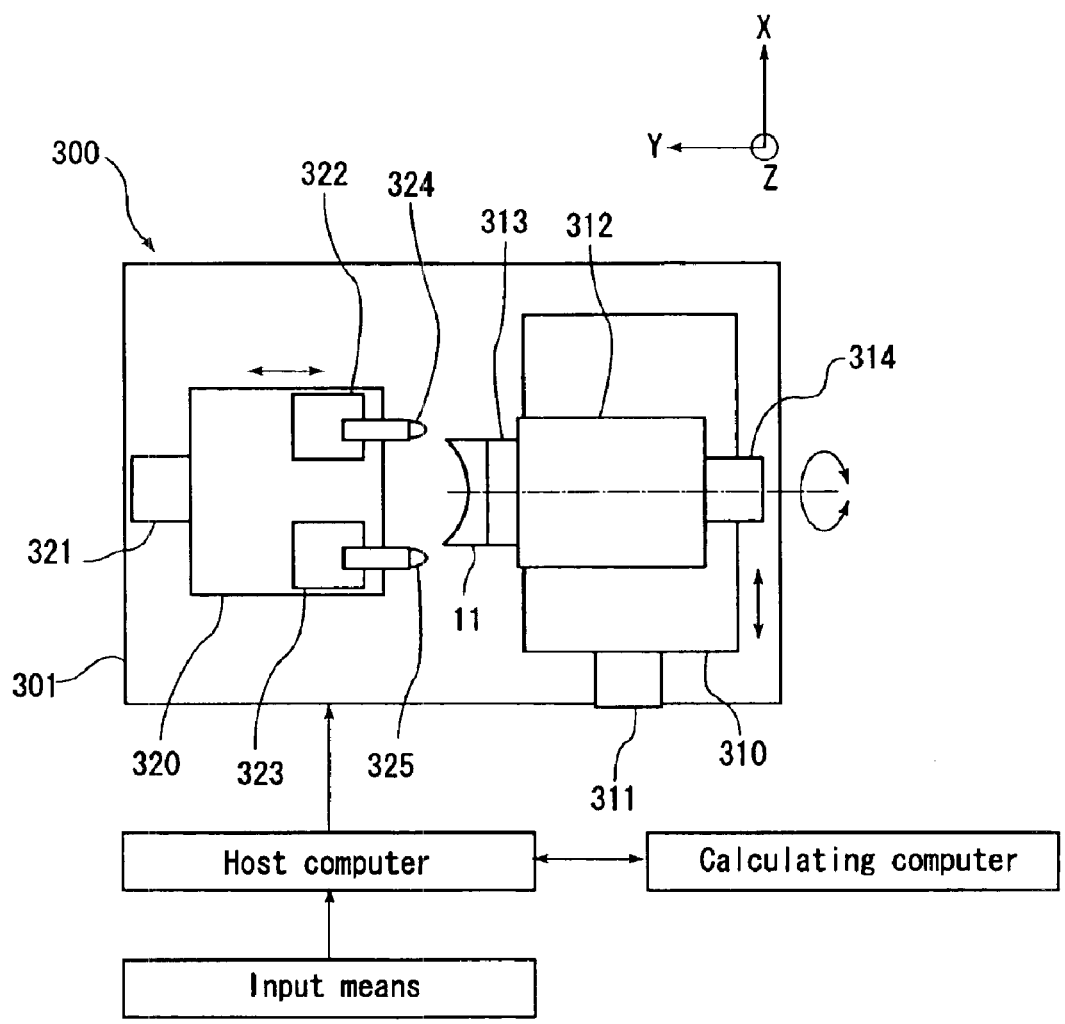
FIG. 3 is a top view showing a schematic configuration of a numerically controlled cutting machine used for the method of producing a spectacle lens according to the present invention.

FIG. 3 shows a schematic configuration of a numerically controlled cutting machine as one example of such a numerically controlled machine. A numerical controlled cutting machine 300 includes an X-axis positioning means 310 and a Y-axis positioning means 320, which are mounted on a bed 301. The X-axis positioning means 310 is driven in an X-axis direction, which is substantially the horizontal direction, by an X-axis drive motor and an encoder 311. The position in the X-axis direction is indexed by the encoder 311. A workpiece shaft rotating means 312 is fixed on the X-axis positioning means 310. A workpiece chuck 313, which is mounted on the workpiece shaft rotating means 312, is rotated by a workpiece rotating shaft drive motor and an encoder 314. The rotational position of the work chuck 313 is indexed by the encoder 314. A semi-finished lens (workpiece) 11 is mounted to the workpiece chuck 313 via a block jig. The Y-axis positioning means 320 is driven in a Y-axis direction which is substantially the horizontal direction perpendicular to the X-axis by a Y-axis drive motor and an encoder 321. The position in the Y-axis direction is indexed by the encoder 321. Two tool holders: a first tool holder 322 and a second tool holder 323 are fixed on the Y-axis positioning means 320. A cutting tool 324 for rough-cutting is fixed on the first tool holder 322, and a cutting tool 325 for finish-cutting is fixed on the second tool holder 323. The cutting tool 324 for rough-cutting is typically made from cemented carbide alloy, and the cutting tool 325 for finish-cutting is typically made from single crystal diamond.

According to the numerical control of the present invention, a center coordinate of the leading end of the cutting tool 324 or 325 is positioned in the normal line direction erected from a point, to be machined, of the workpiece 11 by using three axes of the X-axis positioning means 310, Y-axis positioning means 320, and workpiece shaft rotating means 312. The lens surface based on the designed shape of the target lens is created by continuously performing the positioning of the center coordinate of the leading end of the cutting tool, which corresponds to the point, to be machined, of the workpiece. In this case, the workpiece 11 is rotated, by the workpiece shaft rotating means 312, at a number of rotation in a range of 100 to 3000 rpm. The number of rotation of the workpiece 11 is determined depending on the shape of the workpiece 11 and the kind of cutting (rough-cutting or finish-cutting). The rotational position of the workpiece 11 is indexed by the encoder 314, and the Y-axis positioning means 320 and the X-axis positioning means 310 are positioned in synchronization with the rotation of the workpiece 11. To be more specific, the position of the cutting tool 324 or 325 in the Y-axis direction, which is the rotational axis of the workpiece 11, relative to the position of the workpiece 11 and the position of the cutting tool 324 or 325 in the X-axis direction relative to the position of the workpiece 11 are each synchronized with the rotation of the workpiece 11.

In the numerically controlled cutting machine 300, the cutting work is performed by using the cutting tool 324 for rough-cutting or the cutting tool 325 for finish-cutting, which is changeable to the cutting tool 324. To be more specific, the outer diameter cutting work and the near-finish surface forming rough-cutting work are performed by using the cutting tool 324 for rough-cutting, and the finish-cutting work and the chamfering work are performed by using the cutting tool 325 for finish-cutting.

Cutting data for numerical control, which are composed of outer diameter cutting data, near-finish surface forming rough-cutting data, finish-cutting data, and chamfering data, and which are obtained by calculation on the basis of prescription data of a spectacle lens inputted from an input means by a calculating computer, are transmitted to the numerically controlled cutting machine 300 via a host computer, and are stored in the memory built in the machine 300.

The semi-finished lens 11 fixed to a block jig 20 as shown in FIG. 1(a) is fixed to the workpiece chuck 313, and the outer diameter of the semi-finished lens 11 is cut to a specific outer diameter on the basis of the outer diameter cutting data given for the semi-finished lens 11 by the cutting tool 324 for rough-cutting. The semi-finished lens is then cut on the basis of the near-finish surface forming rough-cutting data by the cutting tool 324 for rough-cutting. In this case, the surface of the semi-finished lens is formed into a rough-cut surface which has a free curved surface shape or a toric or spherical surface shape analogous to a desired lens surface shape and has a surface roughness Rmax of 100 $\mu$m or less. The semi-finished lens is then cut by a thickness of about 0.1 to 5.0 mm on the basis of the finish-cutting data by the cutting tool 325 for finish-cutting. In this case, the surface of the semi-finished lens is formed into a finish-surface which has a lens surface shape based on the prescription data of the spectacle lens and has a surface roughness Rmax of about 0.1 to 10 $\mu$m. The lens, which has been finished in the finish-cutting step, is finally chamfered on the chamfering data by the cutting tool 325 for finish-cutting.

As compared with the above-described method using the machines specialized for respective steps, the shape creating method, which is characterized by continuously performing the series of shape creating works without removal of a workpiece from the workpiece chuck by using one numerically controlled machine 300 including the two kinds of cutting tools, that is, the cutting tool 324 for rough-cutting and the cutting tool 325 for finish-cutting, has the following advantages:

Since each cutting step is performed by using the one machine, it is possible not only to eliminate the need of provision of cutting machines for respective cutting steps but also to eliminate the need of allocation of operators for respective cutting steps. As a result, it is possible not only to reduce the labor cost and thereby reduce the production cost but also to improve the production yield and stabilize and improve the quality by lowering the production yield due to human error and preventing occurrence of variations in quality. Further, it is possible to eliminate the inspection which has been performed for each step.

In the numerically controlled cutting machine 300, the two kinds of cutting tools are used; however, three or more kinds of cutting tools may be used and each of groups of cutting steps be performed by the corresponding one of the cutting tools. Also, the numerically controlled cutting machine 300 may be performed by using only one kind of cutting tool as a specialized near-finish surface forming rough-cutting machine or a specialized finish-cutting machine. Further, in the above embodiment, the workpiece is moved in the X-axis direction and the cutting tool is moved in the Y-axis direction, to move the cutting tool and the workpiece relative to each other; however, there may be adopted a configuration in which the workpiece is disposed at a specific position, and the cutting tool is moved in both the X-axis direction and the Y-axis direction.

Figure 4:
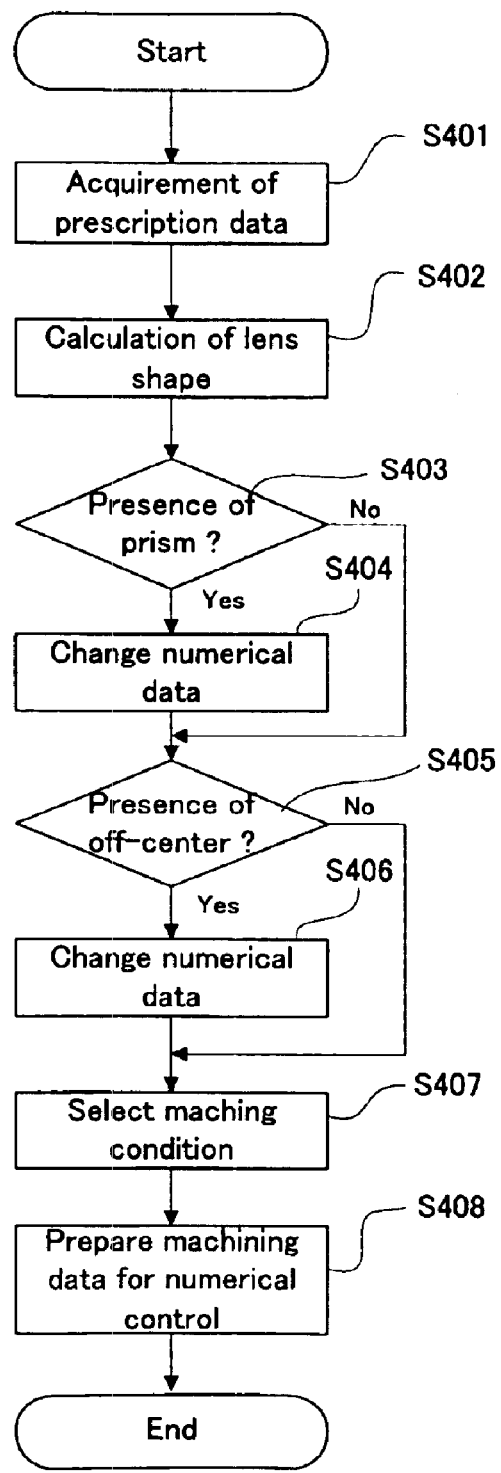
FIG. 4 is a flow chart showing one example of a procedure for preparing machining data for numerical control.

Next, a procedure of preparing machining data for numerical control according to the present invention will be described. FIG. 4 is a flow chart showing a procedure of calculating machining data for numerical control used in shape creation performed by a numerically controlled machine.

In step 401, prescription data of a spectacle lens requested by a customer are acquired. In general, if the spectacle lens is a progressive power lens, the prescription data include an S (spherical) power, a C (cylindrical) power, an astigmatic axis, an addition (ADD) power, a prism, an off-center, a lens thickness, a lens diameter, and a color; and if the spectacle lens is a single-focal lens, the prescription data include an S power, a C power, an astigmatic axis, a prism, an off-center, a lens thickness, a lens diameter, and a color. The prescription data are directly transmitted from a terminal installed in a spectacle shop to a host computer installed in a production department of a lens maker via online operation. Alternatively, the prescription data are once transmitted from a spectacle shop to a relay center via a transmission means such as telephone or facsimile and then transmitted from the relay center to the host computer via online operation. The prescription data can be directly inputted in the host computer by using an input means.

In step 402, the prescription data inputted in the host computer are processed into production data for a production line by a calculating computer, and a combination of curved surfaces of a lens are calculated on the basis of the production data, that is, on the basis of the prescription of the customer. In this way, a lens shape is designed as numerical data for each of prescriptions of customers.

In step 403, it is decided whether or not the prescription data of the spectacle lens contain a prism. A prism is a vector having a direction and a length, and is generally expressed in both prism base (0 to 359°) and length. If the prescription data contain a prism, the procedure goes on to step 404, in which the numerical data of the lens shape are corrected on the basis of a prism amount, that is, by adding data of the prism to the numerical data. Concretely, the numerical data, which express a surface to be machined (designed surface), are inclined in an arbitrary direction corresponding to the direction of the prism by an arbitrary amount corresponding to the length of the prism, and new numerical data of the lens shape are obtained on the basis of a newly determined surface to be machined.

FIG. 5(a) conceptually shows a manner of adding a prism in accordance with the prior art polishing method, and FIG. 5(b) conceptually shows a manner of adding a prism in accordance with the polishing method of the present invention.

A lens base material 11 is fixedly bonded to a block jig 20 via a blocking cement 30 made from a low melting point metal. The blocking cement 30 is formed by pouring a liquid low melting point metal in a cavity of a hollow jig (not shown) interposed between the bonding surface of the lens base material 11 and the block jig 20 and solidifying the metal.

In the manner of adding a prism in accordance with the prior art polishing method, since the lens base material 11 itself must be inclined, it is required to provide a hollow jig with its shape corresponding to each prism amount. For a general multi-focal lens having a progressive surface on the outer surface side, since the convex side must be brought into close-contact with a hollow jig, it is required to provide a hollow jig with its shape corresponding to a basic curve and an addition (ADD) power of each lens base material. As a result, a large number of hollow jigs must be provided for a variety of lens shapes. The prior art manner has another problem that a large variation occurs at the time of manually positioning the lens base material to the hollow jig, which leads to a cause of a failure. After polishing, as shown in FIG. 5(a), a reference surface S of the block jig 20 is parallel to a tangential line L1 at the optical center of the surface to be machined (fitting point, that is, a point located at the center of a pupil when the lens is inserted in a spectacle frame).

On the contrary, in the manner of adding a prism in accordance with the production method of the present invention, as shown in FIG. 5(b), the addition of a prism requires only calculation necessary for inclining a surface to be machined in an arbitrary direction by an arbitrary amount with an intersection A between a rotating axis MC for machining and the surface to be machined taken as a fulcrum (for specifying the inclination). With such calculation, it is possible to create the surface to be machined, in which a tangential line L2 at the optical center of the surface to be machined has been inclined with respect to the reference surface S of the block jig 20 by an angle equivalent to a specific prism amount. As a result, since a prism can be added only by changing the numerical data, it is possible to eliminate the need of provision of a large number of hollow jigs and also to eliminate occurrence of a variation caused by manual operation.

Referring again to FIG. 4, in step 405, it is decided whether or not an off-centering work is contained in the prescription data of the spectacle lens. The off-centering work is performed mainly for reducing the outer diameter of the lens. An off-center amount is a vector having a direction and a length, and is generally expressed in both prism base (0 to 359°) and prism amount. If an off-centering work is contained in the prescription data, the procedure goes on to step 406, in which the numerical data of the lens shape are corrected by adding data of off-center thereto. Concretely, the numerical data expressing a surface to be machined (designed surface) are offset in an arbitrary direction corresponding to the direction of the off-center amount by an arbitrary amount corresponding to the length of the off-center amount from a geometric center (which is a point positioned at the center of the lens determined on the basis of the outer diameter of the lens), and new numerical data of the lens shape based on the newly obtained surface to be machined are obtained.

Figure 6:
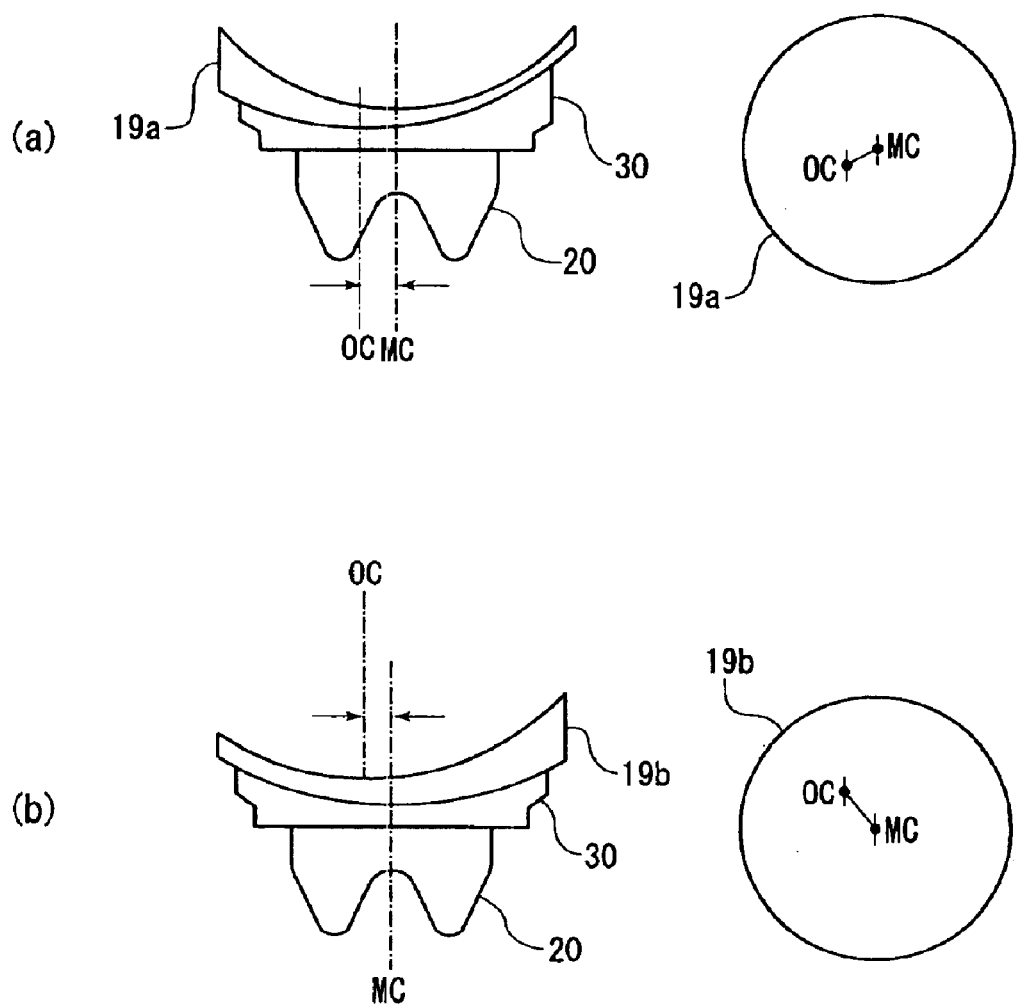
FIGS. 6(*a*) and 6(*b*) are schematic side views and top views showing an arrangement of a workpiece on a block jig in the case of adding an off-center in the shape creating step, wherein FIG. 6(*a*) shows a prior art method, and FIG. 6(*b*) shows a method of the present invention.

FIG. 6(a) conceptually shows a manner of adding an off-center amount in accordance with the prior art polishing method, and FIG. 6(b) conceptually shows a manner of adding an off-center amount in accordance with the polishing method of the present invention.

In the manner of adding an off-center amount in accordance with the prior art polishing method, a lens base material 19a itself must be fixed, in the blocking step, to the block jig 20 in a state in which an optical center OC is off-centered from a rotating axis MC for machining by a specific amount. In this manner, since the lens base material 19a must be fixed to the block jig 20 while being inclined, it is required to provide a hollow jig with its shape corresponding to each off-center amount. As a result, like the manner of adding a prism, a large number of hollow jigs are required to be provided for a variety of lens shapes. The prior art manner has another problem that a large variation occurs at the time of manually positioning the lens base material to the hollow jig, which leads to a cause of a failure.

After polishing, as shown in FIG. 6(a), the rotating axis MC for machining of the block jig 20 corresponds to the geometric center of the surface to be machined. The optical center OC is separated from the rotating axis MC for machining by the off-center amount.

On the contrary, in the manner of adding an off-center in accordance with the production method of the present invention, as shown in FIG. 6(b), the addition of an off-center amount only requires calculation necessary for off-centering a surface to be machined in an arbitrary direction from the geometric center MC by an arbitrary amount. With such calculation, it is possible to create the surface to be machined, in which the optical center OC of the surface to be machined of a machined lens 19b has been off-centered from the rotating axis MC for machining of the block jig 20. As a result, since an off-center amount can be added only by changing the numerical data, it is possible to eliminate the need of provision of a large number of hollow jigs and also to eliminate occurrence of a variation caused by manual operation.

In step 407 shown in FIG. 4, machining conditions are selected. If the machining conditions for a numerically controlled machine are not suitable, there may occur a problem that in the shape creating works, the material of the workpiece cannot withstand a cutting resistance, to cause chipping (fine flakes) on the surface of the workpiece. Such it is difficult to remove chipping in the subsequent steps, the machining conditions must be selected so as to prevent occurrence of chipping. In particular, an ultra-high refractive index material having a refractive index of 1.74 or more or a brittle material of a lens such as CR-39 is liable to cause chipping.

The machining conditions for a numerically controlled machine include the rotational speed of a workpiece, a feed pitch which is a moved amount of a cutting tool per one rotation of a workpiece, a depth-of-cut amount of a cutting tool bitten in a workpiece, and a periphery velocity of a working piece. A plurality of machining patterns are prepared, for each of the near-finish surface forming rough-cutting work, finish-cutting work, outer diameter cutting work, and chamfering work, by combining machining conditions with each other for each of lens shapes, lens materials, and the like based on prescription data of spectacle lenses, and are stored in the calculating computer. The calculating computer calculates numerical data of a final lens shape by adding data of a prism and an off-center to numerical data of a lens shape based on a prescription of a spectacle lens, and selects the optimum one of the plurality of machining pattern on the basis of the numerical data of the final lens shape and the lens base material. Alternatively, an operator may select the optimum one of the plurality of machining pattern and input it in the calculating computer.

The machining conditions will be concretely described below. For a numerically controlled machine in which each of positions of a cutting tool in the X-axis direction and the Y-axis direction is controlled in synchronization with rotation of a workpiece as described above, the rotational speed of the workpiece is set in a range of 100 to 3000 rpm for the rough-cutting work and is set in a range of 100 to 3000 rpm for the finish-cutting work; the feed pitch is set in a range of 0.005 to 1.0 mm/rev for the rough-cutting work and is set in a range of 0.005 to 0.2 mm/rev for the finish-cutting work; and the depth-of-cut amount is set in a range of 0.1 to 10.00 mm/pass for the rough-cutting work and is set in a range of 0.05 to 3.0 mm/pass for the finish-cutting work. For a numerically controlled machine in which cutting such as outer diameter cutting or chamfering of a workpiece is performed with two axes, that is, the X-axis and Y-axis synchronized with each other, the rotational speed of the workpiece is set in a range of 100 to 20000 rpm for the rough-cutting work and is set in a range of 100 to 20000 rpm for the finish-cutting work; the feed pitch is set in a range of 0.005 to 1.0 mm/rev for the rough-cutting work and is set in a range of 0.005 to 0.2 mm/rev for the finish-cutting work; and the depth-of-cut amount is set in a range of 0.1 to 10.00 mm/pass for the rough-cutting work and is set in a range of 0.05 to 3.0 mm/pass for the finish-cutting work.

Of the machining conditions, the feed pitch is most important. The feed pitch is preferably changed depending on a position of a cutting tool relative to a position of a workpiece. For example, the feed pitch is preferably made small at an outer peripheral portion, apart from the rotational center, of a workpiece, that is, at a portion where the velocity of a cutting tool relative to the velocity of the workpiece becomes large, or at a portion where a change in surface shape becomes large. On the other hand, since the larger feed pitch results in higher productivity, the feed pitch may be as large as possible at a portion where chipping caused thereon can be removed by the finish-cutting work.

Figure 7:
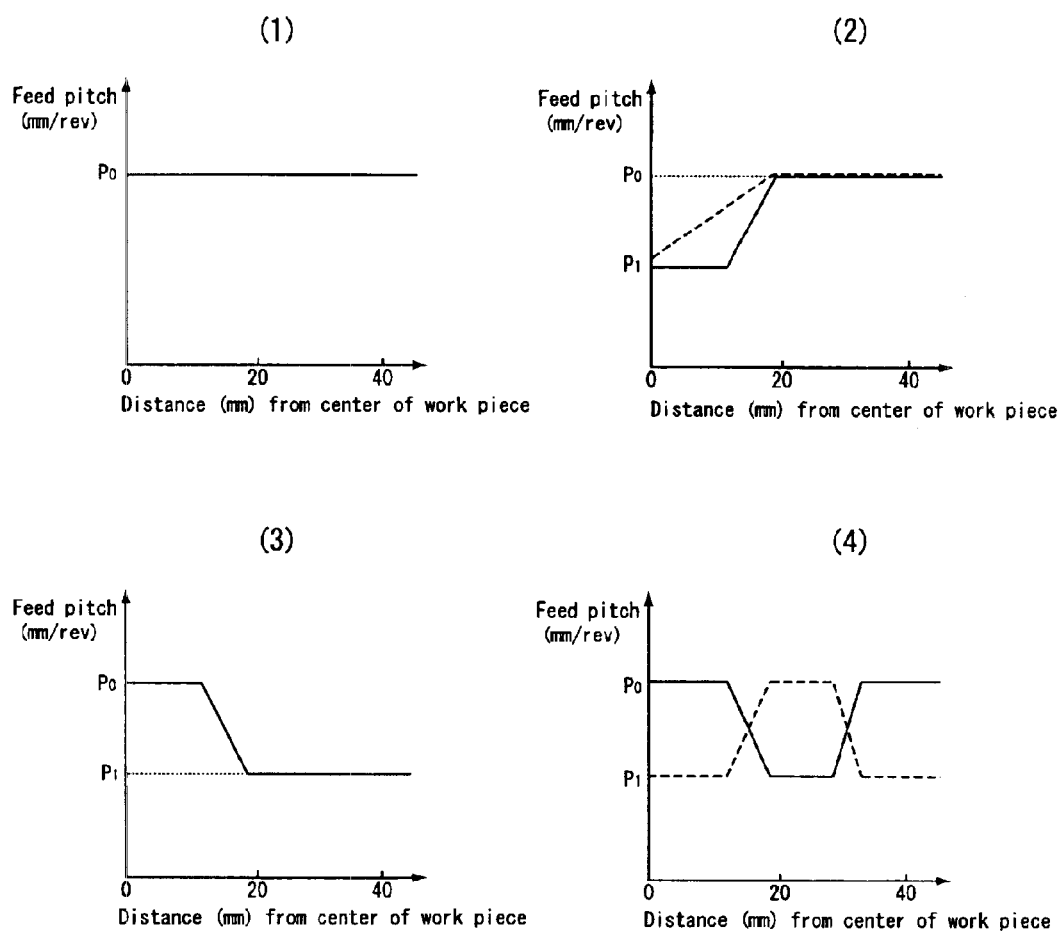
FIGS. 7(1) to 7(4) are graphs showing patterns of feed pitches.

FIGS. 7(1) to 7(4) and FIGS. 8(5) to (8) are graphs showing patterns of feed pitches. In each graph, the horizontal axis designates a distance from the rotational center of a workpiece, and the vertical axis designates a feed pitch. It is to be noted that numeral values on the horizontal axis are for only illustrative purposes. At the time of cutting, a cutting tool is generally moved from an outer peripheral portion to an inner peripheral portion, and accordingly, each pattern will be described from the viewpoint of movement of the cutting tool. FIG. 7(1) shows a pattern in which the feed pitch is kept constant irrespective of/he distance from the center of the workpiece. In this case, the feed pitch is suitably selected according to the material and shape of the workpiece. FIG. 7(2) shows a pattern (solid line) in which the feed pitch is set to a constant value P0 at the outer peripheral portion and central portion, being reduced to a value P1 at the boundary from the central portion to the inner peripheral portion, and is kept at the value P1 at the inner peripheral portion, and a pattern (broken line) in which the feed pitch is set to the constant value P0 at the outer peripheral portion and central portion, and is gradually reduced from the value P0 to the value P1 at the inner peripheral portion. FIG. 7(3) shows a pattern in which the feed pitch is kept at the constant value P1 at the outer peripheral portion, being increased to the value P0 at the boundary from the central portion to the inner peripheral portion, and is kept at the value P0 at the inner peripheral portion. FIG. 7(4) shows a pattern (solid line) in which the feed pitch is kept at the constant value P0 at the outer peripheral portion and the inner peripheral portion, and is reduced to the value P1 at the central portion, and a pattern (broken line) in which the feed pitch is kept at the constant value P1 at the outer peripheral portion and the inner peripheral portion, and is increased to the value P0 at the central portion. In this case, the feed pitches at the outer and inner peripheral portions may be different from each other.

FIG. 8(5) shows patterns, in each of which the feed pitch is linearly changed from the outer peripheral portion to the inner peripheral portion, more specifically, the pattern (broken line) in which the feed pitch is increased from the outer peripheral portion to the inner peripheral portion, and the pattern (solid line) in which the feed pitch is reduced from the outer peripheral portion to the inner peripheral portion. FIG. 8(6) shows a pattern (solid line) in which the feed pitch is rapidly reduced at the outer peripheral portion, and is moderately reduced at the central portion and inner peripheral portion, and a pattern (broken line) in which the feed pitch is moderately increased at the outer peripheral portion and central portion and is rapidly increased at the inner peripheral portion. FIG. 8(7) shows a continuous pattern (solid line) in which the feed pitch is largest at the central portion and becomes small at the inner peripheral portion and outer peripheral portion, and a continuous pattern (broken line) in which the feed pitch is smallest at the central portion and becomes large at the outer peripheral portion and the inner peripheral portion. FIG. 8(8) shows a pattern (broken line) in which the feed pitch is stepwise reduced from the outer peripheral portion to the inner peripheral portion, and a pattern (solid line) in which the feed pitch is stepwise increased from the outer peripheral portion to the inner peripheral portion.

A suitable feed pitch pattern is selected from these patterns according to a final lens shape, a lens material, and the like. For example, in the near-finish surface forming rough-cutting work, even if chipping occurs, such chipping can be removed by the finish-cutting work. Accordingly, in this case, the pattern (broken line) shown in FIG. 8(5) can be adopted, in which the value P1 may be set in a range of 0.05 to 0.20 mm/rev and the value P0 may be set in a range of 0.10 to 0.40 mm/rev.

In the finish-cutting work, the pattern shown in FIG. 7(1) is mostly adopted, in which the value P0 may be typically set in a range of 0.01 to 0.10 mm/rev. In the case of cutting a material for a lens having an astigmatism of 2.00 D or more irrespective of the refractive index, chipping is easy to occur, and accordingly, the pattern shown in FIG. 7(3) may be adopted, in which the value P0 may be set in a range of 0.03 to 0.10 mm/rev, and the value P1 may be set in a range of 0.01 to 0.07 mm/rev. In this case, the feed pitch P1 may be kept in a range of 5 to 15 mm from the outermost periphery.

In the case of cutting a material for an ultra-high refractive index lens having a refractive index of 1.74 or more or a brittle material such as CR-39, the pattern (1) is preferably adopted irrespective of the lens shape, in which the value P0 may be set in a range of 0.05 mm/rev or less. In the case of cutting a material for a lens having an astigmatism of 2.00

D or more, the feed pitch at the outer peripheral portion may be made smaller than that at the inner peripheral portion. For example, the pattern shown by the solid line in FIG. 7(3), the pattern shown by the broken line in FIG. 8(5), the pattern shown by the broken line in FIG. 8(6), and the pattern shown by the solid line in FIG. 8(8) can be adopted.

In the case of cutting a spherical surface or a rotation-symmetric aspherical surface, since a cutting tool moves only in one direction, there may occur less chipping. Accordingly, in this case, the pattern shown in FIG. 7(1) can be adopted, in which the value P0 may be set in a range of 0.03 to 0.10 mm/rev. In this case, the pattern shown by the broken line in FIG. 8(6), which is effective to increase productivity while keeping high cutting quality, may be adopted. To be more specific, the above pattern may be approximated by a quadric function using the value P0=0.07 to 0.20 mm/rev and the value P1=0.02 to 0.07 mm/rev.

When chipping cannot be sufficiently prevented even if the feed pitch at the outer peripheral portion is set to be smaller than that at the inner peripheral portion as shown by the pattern in FIG. 7(3), it is effective to reduce the ordinary rotational speed, for example, in a range of 300 to 1000 rpm by about 20 to 40%.

If a plastic lens is cut by using each of the patterns shown by the solid line and the broken line in FIG. 7(2) and the pattern shown by the broken line in FIG. 7(4), galling is easy to occur at the central portion, and accordingly, in this case, the feed pitch at the central portion may be made smaller (P0=0.03 to 0.10 mm/rev, P1=0.01 to 0.03 mm/rev). In the pattern shown by the broken line in FIG. 7(4), the values P1 at the outer peripheral portion and the inner peripheral portion may be different from each other. For example, the value P1 at the outer peripheral portion is set to 0.03 mm/rev, and the value P1 at the inner peripheral portion is set to 0.01 mm/rev.

A control method for making a peripheral velocity constant by changing the rotational speed of a workpiece depending on a position of a cutting tool in the radial direction of the workpiece can be adopted. Such a control method is effective to suppress occurrence of chipping at the outer peripheral portion.

Finally, in step 408, the calculating computer creates machining data for numerical control used for a numerically controlled machine on the basis of both the numerical data for the final lens shape and the machining pattern thus obtained. The machining data for numerical control are transmitted to the host computer and are stored therein. On the basis of these machining data for numerical control, the above-described shape creating steps are carried out.

In the above description regarding preparation of machining data for numerical control, the corrections for a prism and an off-center are performed separately from each other; however, since each of a prism and an off-center is a vector, the corrections for a prism and an off-center may be simultaneously performed.

According to the above-described embodiment of the method of producing a spectacle lens of the present invention, since the process of creating a lens surface shape by cutting includes the outer diameter cutting step, near-finish surface forming rough-cutting step, finish-cutting step, and chamfering step, which are different from each other in kinds and movements of cutting tools, the cutting in each step can be performed under the optimum cutting conditions by using the optimum cutting tool. As a result, it is possible to rapidly create the lens surface shape at a high accuracy.

Since at least the near-finish surface forming rough-cutting step and the finish-cutting step are performed by cutting using a numerically controlled machine, it is possible to create all kinds of shapes of curved lens surfaces containing an inner surface of an inner progressive power lens having a complex curved surface.

Since all the shape creating steps can be continuously performed by one numerically controlled machine capable of selectively using at least two kinds of cutting tools: a finish-cutting tool and a rough-cutting tool, it is possible to efficiently produce a lens having a stable quality at a high yield.

According to the method of producing a spectacle lens of the present invention, since works for adding a prism and an off-center can be performed without changing a jig only by calculation, it is possible to produce a spectacle lens excellent in machining accuracy with high productivity.

In addition, since the cutting speed can be increased while suppressing occurrence of chipping by changing a machining pattern depending on a lens surface shape and a lens material based on a prescription of a spectacle lens, it is possible to enhance productivity while suppressing occurrence of a failure.

As described above, according to the method of producing a spectacle lens of the present invention, it is possible to create a lens surface shape having a complex curved surface with high productivity.

Further, according to a polishing tool of the present invention, it is possible to uniformly mirror-polish the lens surface shape having the complex curved surface, which has been created by the production method of the present invention.

INDUSTRIAL APPLICABILITY

The method of producing a spectacle lens according to the present invention can produce a lens having a progressive surface or a curved surface obtained by synthesizing a progressive surface with a toric surface, for example, a progressive power lens having a progressive surface on the inner surface side.

The polishing tool of the present invention can be used for mirror-polishing the surface created by the above production method, to produce a spectacle lens.

What is claimed is:

1. A method of producing a spectacle lens, comprising:
   a shape creating step of creating a lens surface shape based on a prescription of a spectacle lens onto a spectacle lens base material by machining at least one of a concave surface and a convex surface of said spectacle lens base material;
   wherein said shape creating step comprises a near-finish surface forming rough-cutting step of creating a near-finish surface shape analogous to the lens surface shape based on said prescription of the spectacle lens onto said spectacle lens base material by numerically controlled cutting based on machining data for numerical control; and a finish-cutting step of creating the lens surface shape based on said prescription of the spectacle lens from said near-finish surface shape by numerically controlled cutting based on the machining data for numerical control.

2. A method of producing a spectacle lens according to claim 1, wherein said numerically controlled cutting is performed by rotating said spectacle lens base material and simultaneously synchronizing a position of a cutting tool in a rotational axis direction of said spectacle lens base material relative to a position of said spectacle lens base material with the rotation of said spectacle lens base material and also synchronizing a position of said cutting tool in the direction perpendicular to said rotational axis direction relative to a position of said spectacle lens base material with the rotation of said spectacle lens base material.

3. A method of producing a spectacle lens according to claim 2, wherein said near-finish surface forming rough-cutting step and said finish-cutting step are continuously carried out by using a numerically controlled machine provided with a cutting tool for said near-finish surface forming rough-cutting step and a cutting tool for said finish-cutting step.

4. A method of producing a spectacle lens according to claim 2, wherein one or more of a feed pitch of said cutting tool, a depth-of-cut amount of said cutting tool, and a rotational speed of said spectacle lens base material are changed according to a position of said cutting tool relative to a position of said spectacle lens base material.

5. A method of producing a spectacle lens according to claim 4, wherein said feed pitch on an outer peripheral side of said spectacle lens base material is smaller than that on an inner peripheral side of said spectacle lens base material.

6. A method of producing a spectacle lens according to claim 1, wherein data of a prism amount contained in said prescription of the spectacle lens are added to said machining data for numerical control.

7. A method of producing a spectacle lens according to claim 1, wherein data of an off-center amount contained in said prescription of the spectacle lens are added to said machining data for numerical control.

8. A method of producing a spectacle lens according to claim 1, wherein said shape creating step further comprises an outer diameter cutting step of reducing an outer diameter of said spectacle lens base material into a specific outer diameter by cutting; and a chamfering step of chamfering, after said finish-cutting step, an edge of said spectacle lens base material by cutting.

9. A method of producing a spectacle lens according to claim 1, further comprising a mirror-polishing step for smoothening roughness on the at least one of said concave surface and the convex surface of the spectacle lens base material, said mirror-polishing step being carried out after said shape creating step.

10. A method of producing a spectacle lens according to claim 1, wherein said lens surface shape is a spherical surface, a toric surface, rotation-symmetric aspherical surface, a curved surface obtained by synthesizing a toric surface with an aspherical surface, a progressive surface, or a curved surface obtained by synthesizing a progressive surface with a toric surface.

11. A method of producing a spectacle lens according to claim 1, wherein the entire shape creating step is continuously performed without removal of the spectacle lens base material from a workpiece chuck.

12. A method of producing a spectacle lens according to claim 1, wherein said near-finish surface forming rough-cutting step is carried out by a first cutting tool for rough-cutting and said finish-cutting step is carried out by a second cutting tool for finish-cutting.

13. A method of producing a spectacle lens according to claim 1, wherein said concave surface is an inner surface.

14. A method of producing a spectacle lens according to claim 1, wherein said convex surface is an outer surface.

* * * * *